(12) United States Patent
Ton-That et al.

(10) Patent No.: US 8,493,684 B1
(45) Date of Patent: Jul. 23, 2013

(54) CALIBRATING VOICE COIL MOTORS

(75) Inventors: Luan Ton-That, San Jose, CA (US); David Rutherford, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 69 days.

(21) Appl. No.: 13/194,724

(22) Filed: Jul. 29, 2011

Related U.S. Application Data

(63) Continuation of application No. 12/192,973, filed on Aug. 15, 2008, now Pat. No. 7,995,305.

(60) Provisional application No. 60/965,406, filed on Aug. 20, 2007.

(51) Int. Cl.
*G11B 5/55* (2006.01)

(52) U.S. Cl.
USPC .......................................... 360/78.06; 360/75

(58) Field of Classification Search
None
See application file for complete search history.

(56) References Cited

U.S. PATENT DOCUMENTS

| | | | |
|---|---|---|---|
| 7,145,744 B1 | 12/2006 | Clawson et al. | |
| 7,209,312 B1 | 4/2007 | Sutardja | |
| 7,248,427 B1 | 7/2007 | Everett et al. | |
| 7,321,479 B2 | 1/2008 | Kim et al. | |
| 7,333,286 B2 | 2/2008 | Jung et al. | |
| 7,423,831 B2 | 9/2008 | Gami et al. | |
| 7,457,074 B2 | 11/2008 | Sado et al. | |
| 7,468,859 B2 | 12/2008 | Hansen et al. | |
| 7,522,370 B1 | 4/2009 | Sutardja | |
| 7,561,366 B2 | 7/2009 | Wasa et al. | |
| 7,576,937 B2 | 8/2009 | Nojiri et al. | |
| 7,619,848 B2 | 11/2009 | Park et al. | |
| 7,630,161 B2 | 12/2009 | Nakajima et al. | |
| 7,710,682 B2 | 5/2010 | Mizukoshi et al. | |
| 7,738,200 B2 | 6/2010 | Annampedu et al. | |
| 7,751,144 B1 | 7/2010 | Sutardja | |
| 7,773,335 B1 * | 8/2010 | Adler et al. | 360/75 |
| 7,852,598 B1 | 12/2010 | Sutardja | |
| 8,023,216 B1 * | 9/2011 | Cheung et al. | 360/75 |
| 8,184,393 B1 * | 5/2012 | Sutardja | 360/77.07 |
| 8,194,343 B1 * | 6/2012 | Adler et al. | 360/75 |
| 2006/0171058 A1 | 8/2006 | Chan et al. | |
| 2008/0137226 A1 | 6/2008 | Veda et al. | |

OTHER PUBLICATIONS

U.S. Appl. No. 12/186,441, "A Method to Write Ramp-Track", filed Aug. 5, 2008, application as filed, 66 pages.

* cited by examiner

*Primary Examiner* — Hoa T Nguyen
*Assistant Examiner* — James L Habermehl

(57) ABSTRACT

Methods, systems, and apparatus, including computer program products, are described for calibrating voice coil motors. In one aspect, a method is provided that includes seeking toward an outer diameter of a machine readable medium from a target servo track to a blank portion of the machine readable medium. A radial velocity of an actuator is determined after accelerating the actuator to a target radial velocity. The radial velocity is compared to the target radial velocity, and a current, that is used to controllably modify the radial velocity of the actuator if the radial velocity is different from the target radial velocity, is calibrated.

20 Claims, 9 Drawing Sheets

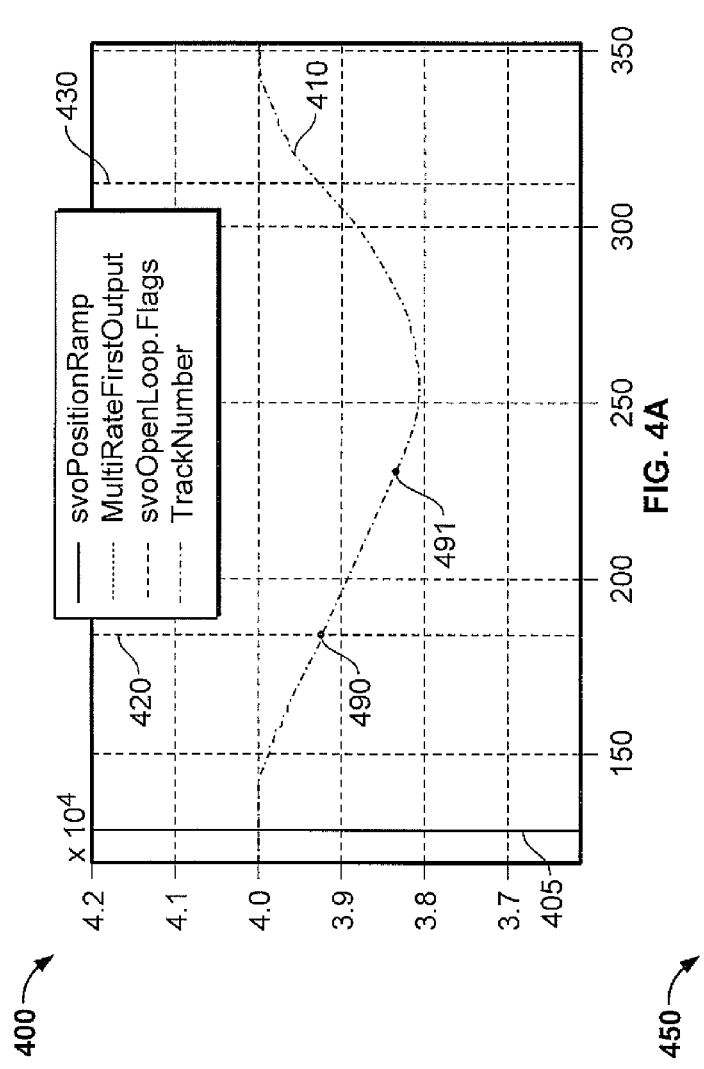
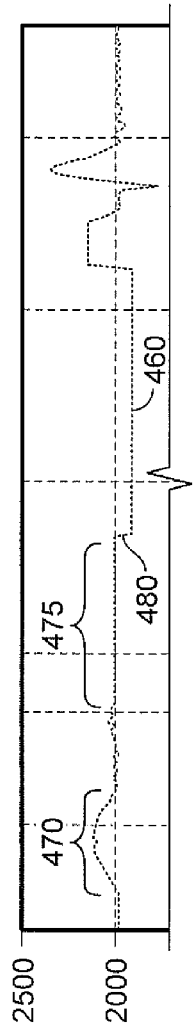
FIG. 4A
FIG. 4B

CALIBRATING VOICE COIL MOTORS

CROSS-REFERENCE TO RELATED APPLICATIONS

This present disclosure is a continuation of U.S. application Ser. No. 12/192,973, filed on Aug. 15, 2008, which claims priority under 35 U.S.C. §119(e) to U.S. Provisional Application No. 60/965,406, filed on Aug. 20, 2007.

TECHNICAL FIELD

The subject matter of this patent application relates to signal processing.

BACKGROUND

Conventional disk drives can use a rotary voice coil motor (VCM) actuator for positioning the read/write heads. A servo control system receives servo positioning information read by the read/write heads from the data tracks, typically from equally-angularly-spaced servo sectors that extend generally radially across the tracks. The servo control system generates control signals to the VCM to maintain the read/write heads on track and move them to the desired tracks for reading and writing of data. The servo sectors also contain servo timing marks (STMs) that indicate the start of the servo sectors.

In some implementations, a set of spirals can be written on a blank disk. Timing and positioning information can be derived from the spirals for use in controlling the read/write heads to write servo sectors. The servo sectors can form a band of servo tracks. The servo tracks can be used to accelerate the read/write heads to a target velocity to write another set of spirals. The process of alternating between writing servo tracks and writing spirals can be repeated to write additional servo tracks on the blank disk. Additional details of this self-servo write (SSW) process can be found in U.S. Pat. No. 7,209,312, entitled "Self-servo-write Using Ramp-tracks", which is incorporated by reference herein for all purposes.

When the read/write heads are positioned above a blank portion of a disk, servo sector timing marks are not available as a feedback source, for example, for regulating variations in target velocities of the VCM actuator. A back-electromotive-force (BEMF), from voice coils of a VCM, for example, may serve as a feedback source. However, the BEMF may include noise and be at a low resolution, so the BEMF may not be an ideal feedback source. Accordingly, while the servo tracks are being used to accelerate the VCM to the target velocity, an open loop control system may be used. For example, moving the read/write heads at a constant velocity and moving the read/write heads back to a starting track can be performed using the open loop control system.

As a VCM moves, torques on the VCM structure (e.g., cable bias, windage, head friction) may affect the momentum of the VCM, thereby creating variability in the velocity of the VCM.

SUMMARY

Methods, systems, and apparatus, including computer program products, are described for calibrating voice coil motors.

In one aspect, an apparatus is provided that includes a control module that directs a servo controller to seek toward an outer diameter of a machine readable medium from a target servo track to a blank portion of the machine readable medium, and determines a radial velocity of an actuator after accelerating the actuator to a target radial velocity; a comparison module that compares the radial velocity to the target radial velocity; and a calibration module that calibrates a current used to controllably modify the radial velocity of the actuator if the radial velocity is different from the target radial velocity. Other embodiments of this aspect include corresponding systems, methods, and computer program products.

One or more implementations can optionally include one or more of the following features. The radial velocity can be different from the target radial velocity by a first threshold amount. The control module can use the calibrated current to maintain the actuator at the target radial velocity and determine a variability of the radial velocity of the actuator. The comparison module can compare the variability to a target variability. The calibration module can calibrate the target radial velocity if the variability is different from the target variability. The variability can be different from the target variability by a second threshold amount. The control module can use the current to maintain the actuator at a constant radial velocity. The apparatus can further include heads that write a spiral near an end of a servo band and write a servo track using the spiral. A magnitude of the current can be substantially equal to a magnitude of a countercurrent produced by torques on the actuator.

In another aspect, a method is provided that includes calibrating a current using a servo band; applying the calibrated current to an actuator to maintain the actuator at a target radial velocity; writing one or more spirals near an end of the servo band; and writing one or more servo tracks using the one or more written spirals. Other embodiments of this aspect include corresponding systems, apparatus, and computer program products.

One or more implementations can optionally include one or more of the following features. The method can further include determining a variability of a radial velocity of the actuator; comparing the variability to a target variability; and calibrating the target radial velocity if the variability is different from the target variability. The variability can be different from the target variability by a threshold amount. The method can further include using the current to maintain the actuator at a constant radial velocity. A magnitude of the current can be substantially equal to a magnitude of a countercurrent produced by torques on the actuator.

In another aspect, a system is provided that includes a servo controller; an actuator; a control module that directs the servo controller to seek toward an outer diameter of a machine readable medium from a target servo track to a blank portion of the machine readable medium, and determines a radial velocity of the actuator after accelerating the actuator to a target radial velocity; a comparison module that compares the radial velocity to the target radial velocity; and a calibration module that calibrates a current used to controllably modify the radial velocity of the actuator if the radial velocity is different from the target radial velocity. Other embodiments of this aspect include corresponding methods, apparatus, and computer program products.

One or more implementations can optionally include one or more of the following features. The radial velocity can be different from the target radial velocity by a first threshold amount. The control module can uses the calibrated current to controllably maintain the actuator at the target radial velocity and determine a variability of the radial velocity of the actuator. The comparison module can compare the variability to a target variability. The calibration module can calibrate the target radial velocity if the variability is different from the target variability. The variability can be different from the target variability by a second threshold amount. The control module can use the current to maintain the actuator at a constant radial velocity. The system can further include heads that write a spiral near an end of a servo band and write a servo track using the spiral.

Particular embodiments of the subject matter described in this specification can be implemented to realize none, one or more of the following advantages. Calibrating a VCM can increase a precision of the VCM by reducing target velocity variations of the VCM. Increasing the precision of the VCM can reduce variations in the placement of spirals, thereby reducing variations in the placement of servo tracks (e.g., servo wedges). Accurate placement of the servo tracks can increase the quality and production yield of hard disk drives.

In addition, reducing variations in the placement of spirals can also allow longer spirals (e.g., spirals that are 25%-50% longer than conventional spirals) to be written. Longer spirals can reduce a number of spirals written in a SSW process, thereby reducing the SSW process time and increasing the robustness of the SSW process.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4A is a plot showing example head position over time.

FIG. 4B is a plot showing example voice coil motor current over time.

DETAILED DESCRIPTION

Figure 1:
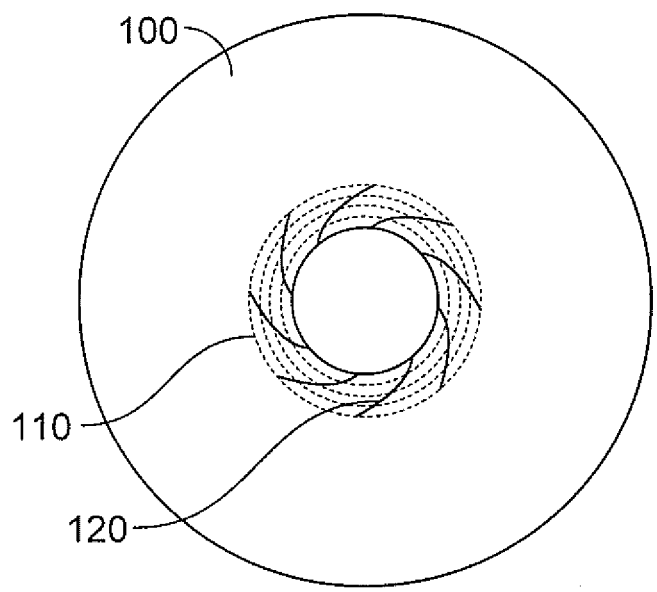
FIG. 1 is a diagram of an example machine readable medium that includes a first set of servo tracks and a first set of spirals.

FIG. 1 is a diagram of an example machine readable medium 100 that includes a first set of servo tracks 110 (e.g., a servo band) and a first set of spirals 120 (e.g., a spiral band). The machine readable medium 100 can be, for example, a magnetic disk for a hard disk drive. Initially, the machine readable medium 100 is blank and does not have data (e.g., timing information) written on it. A first set of spirals 120 can be written from an inner diameter of the machine readable medium 100, using a crash stop as a reference, for example. The spirals 120 can provide positioning and timing information so that a head (e.g., read/write head) can be moved to and maintained at fixed radii on the machine readable medium 100, for example. The head, while moving along a fixed radius, can use the timing information to write wedges that can form a servo track. In some implementations, the head can move to a plurality of fixed radii to write servo tracks that form a set of servo tracks 110.

Figure 2:
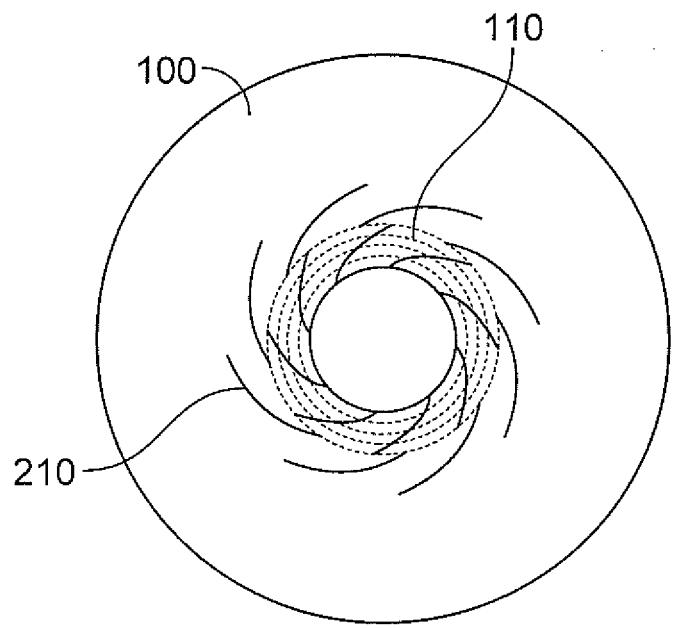
FIG. 2 is a diagram of the example machine readable medium of FIG. 1 that further includes a second set of spirals.

FIG. 2 is a diagram of the example machine readable medium 100 of FIG. 1 that further includes a second set of spirals 210. Positioning and timing information from the first set of servo tracks 110 can be used to accelerate the VCM to a target velocity. In some implementations, a plurality of VCMs can be accelerated to the target velocity. In order to accelerate the VCM to the target velocity, a current is applied to the actuator.

Information from the servo tracks (e.g., the first set of servo tracks 110) can be used as a feedback source by a controller, for example, to determine an amount of current used to accelerate a head to a target velocity according to a current profile. The current can change for each servo sector. However, when the head is positioned over a blank portion of the machine readable medium 100, information from servo tracks is no longer available as a feedback source.

The momentum of a VCM moving at the target velocity can be maintained by using an additional current (e.g., a constant current) to compensate for a countercurrent produced by external torques acting on the VCM. For example, the current can be substantially equal to the countercurrent. Because the torques on the VCM structure are similar when a head is positioned over a blank portion of a machine readable medium, and when the head is positioned over a previous servo band, a target velocity for writing spirals in the blank portion is similar to a target velocity when the head is positioned over the previous servo band. Therefore, the current that is used to maintain the VCM at the target velocity over the blank portion can be calibrated over the previous servo band.

However, timing information can be determined using a previous servo band (e.g., the first set of servo tracks 110), and the timing information can be used to determine the velocity of the VCM. The current can be calibrated on a servo band, before moving to a blank area of a machine readable medium. For example, the timing information can be used to determine the location of the read/write heads in order to determine the velocity of the VCM. The target velocity can be reached by adjusting the current, and the current associated with the target velocity can be applied to the VCM to maintain the target velocity. Using the momentum of the VCM moving at the target velocity, the VCM can move to a blank area of the disk and the second set of spirals 210 can be written.

Figure 3:
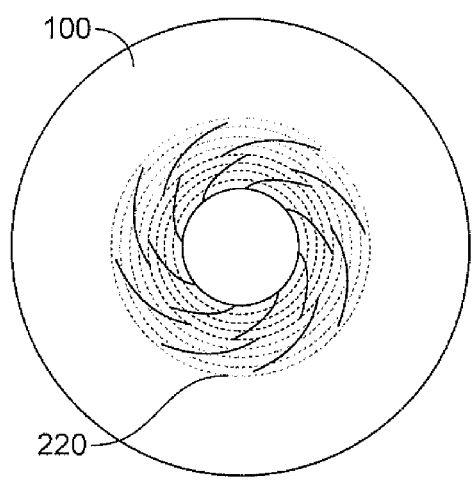
FIG. 3 is a diagram of the example machine readable medium of FIG. 2 that further includes a second set of servo tracks.

FIG. 3 is a diagram of the example machine readable medium of FIG. 2 that further includes a second set of servo tracks 220. The second set of servo tracks 220 can be written in a manner similar to the one described with reference to the first set of servo tracks 110. In particular, a head can track follow the second set of spirals 210 to write the second set of servo tracks 220. The process of alternating between writing spirals and servo tracks can continue for a desired number of servo bands.

FIG. 4A is a plot 400 showing example head position over time. The x-axis of the plot 400 represents sample numbers. The samples can represent a unit of time (e.g., 100 microseconds). The y-axis of the plot 400 represents track numbers. The track numbers can identify the servo tracks in a servo band. In some implementations, tracks that are located at a greater radial distance from the inner diameter (e.g., tracks located closer to the outer diameter) are identified with a lower track number. For example, a first servo track can be identified by a track number 40,000. A second servo track, that can be identified by a track number 39,000, is located closer to the outer diameter than the first servo track. The track numbers can be used to show the location of the VCM, and in combination with the sample numbers, the plot 400 can show the movement of the VCM over time. The velocity of the VCM can be represented by the slope of the curve 410, or the change in track numbers over the change in sample numbers (e.g., 40 tracks per sample). In some implementations, a spiral can be written during the time between the points indicated by 490 and 491. For example, during this time, a velocity of a head can be maintained at a constant target velocity, and the head can write the spiral.

FIG. 4B is a plot 450 showing example voice coil motor current over time. The x-axis of plot 450 represents sample numbers. The y-axis of plot 450 represents current magnitude in digital to analog converter (DAC) numbers, which can be converted into current units (e.g., milliamps). Plot 450 can be used in combination with plot 400 to show current magnitudes applied to a VCM and associated movement and velocities of the VCM.

Referring to FIG. 4A and FIG. 4B, a VCM can begin seeking from a target servo track (e.g., a starting servo track). The target servo track can be located, for example, in a set of servo tracks that have been previously written. For example, the VCM can seek to the target servo track 40,000 as shown in FIG. 4A. From the target servo track (e.g., at the time indicated by line 405), the VCM can accelerate from zero velocity to a target velocity. During this time, servo tracks in the servo band (e.g., the first set of servo tracks 110), can provide feedback to the VCM.

For example, in the plot 400, the flat portion of the curve 410 represents the VCM track following the track 40,000. While the VCM is in a servo band (e.g., between tracks 40,000 and approximately 39,250), servo tracks can provide positioning and timing information, the velocity of the VCM can be determined, and a current can be calculated to accelerate the VCM to the target velocity. The line 420 represents an edge of a servo band (e.g., approximately track number 39,250), where a head can exit a portion of a machine readable medium that includes the servo band and enter a blank portion of the machine readable medium. Line 430 represents the edge of the servo band, where the head can re-enter the portion of the machine readable medium that includes the servo band from the blank portion. During the time between the lines 420 and 430, for example, the head is positioned over the blank portion that does not include positioning or timing information. Therefore, the VCM is accelerated to the target velocity within the servo band.

Temporarily referring to plot 450, a portion 470 of the curve 460 shows a current being applied to the VCM to accelerate the VCM to the target velocity. During another portion 475 of the curve 460, a constant current can be applied to the VCM to maintain a constant velocity, for example, for writing a spiral. After a predetermined amount of time, a different current 480 (e.g., a reduced current) is applied to the VCM. Changing the current can turn the VCM around so that the VCM returns to the servo band (e.g., the edge of the servo band as shown by line 430 in FIG. 4A). The current can be reduced after the VCM has been accelerated to the target velocity. For example, in plot 400, the substantially constant slope of the curve 410 can show that the VCM is moving at the target velocity.

Calibrating the current to accelerate the VCM to a target velocity can be performed for each servo band. Servo tracks in each servo band can be used as timing information to perform the calibration. Using the calibrated current to maintain a constant velocity allows spiral bands to be written over blank areas of machine readable mediums, where timing information is not available to measure the velocity of the VCM. The current can be calibrated in each servo band before, for example, succeeding spiral bands are written.

Figure 5:
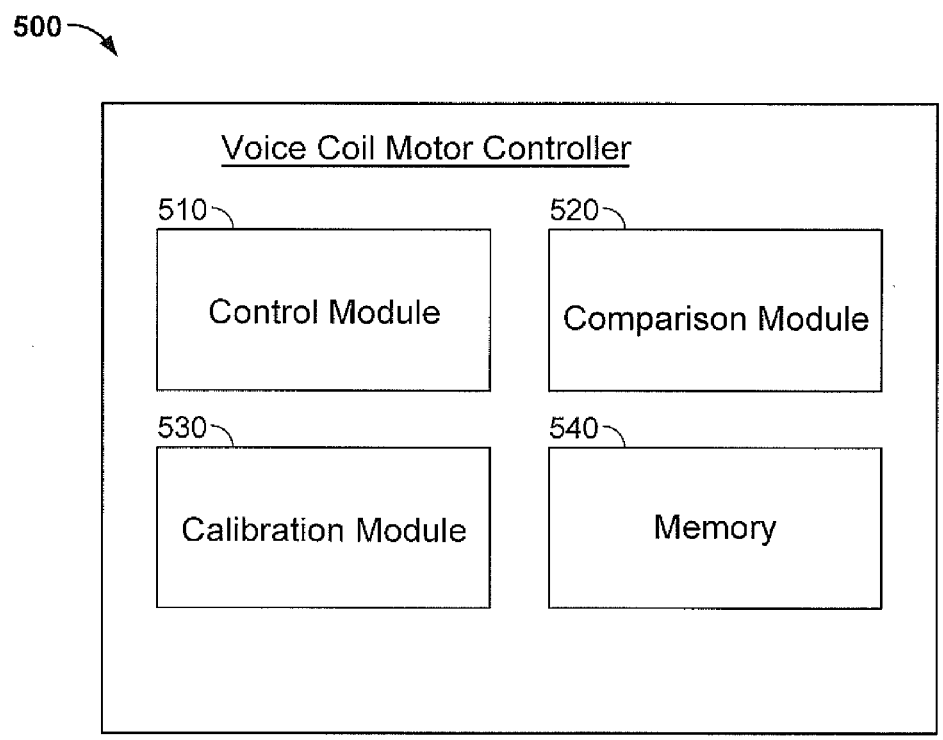
FIG. 5 is a conceptual block diagram of an example voice coil motor controller.

FIG. 5 is a conceptual block diagram of an example voice coil motor controller 500. The VCM controller 500 includes a control module 510, a comparison module 520, a calibration module 530, and a memory 540 (e.g., one or more registers). The control module 510 can direct a servo controller, for example, to control mechanical operations, such as head positioning. The control module 510 can include read/write channel signal processing circuitry. The control module 510 can provide information (e.g., timing information, and head positioning information) to the comparison module 520.

The comparison module 520 can use the information to determine speed characteristics (e.g., velocities, and variability in the velocities) of an associated VCM. In addition, the comparison module 520 can use the information to compare changes in the speed characteristics. The calibration module 530 can calibrate a current profile (e.g., including a current magnitude) using the speed characteristics. The information, speed characteristics, and current profile can be stored in the memory 540, for example. The current profile can be used by the control module 510 to calibrate the current applied to the VCM.

Figure 6:
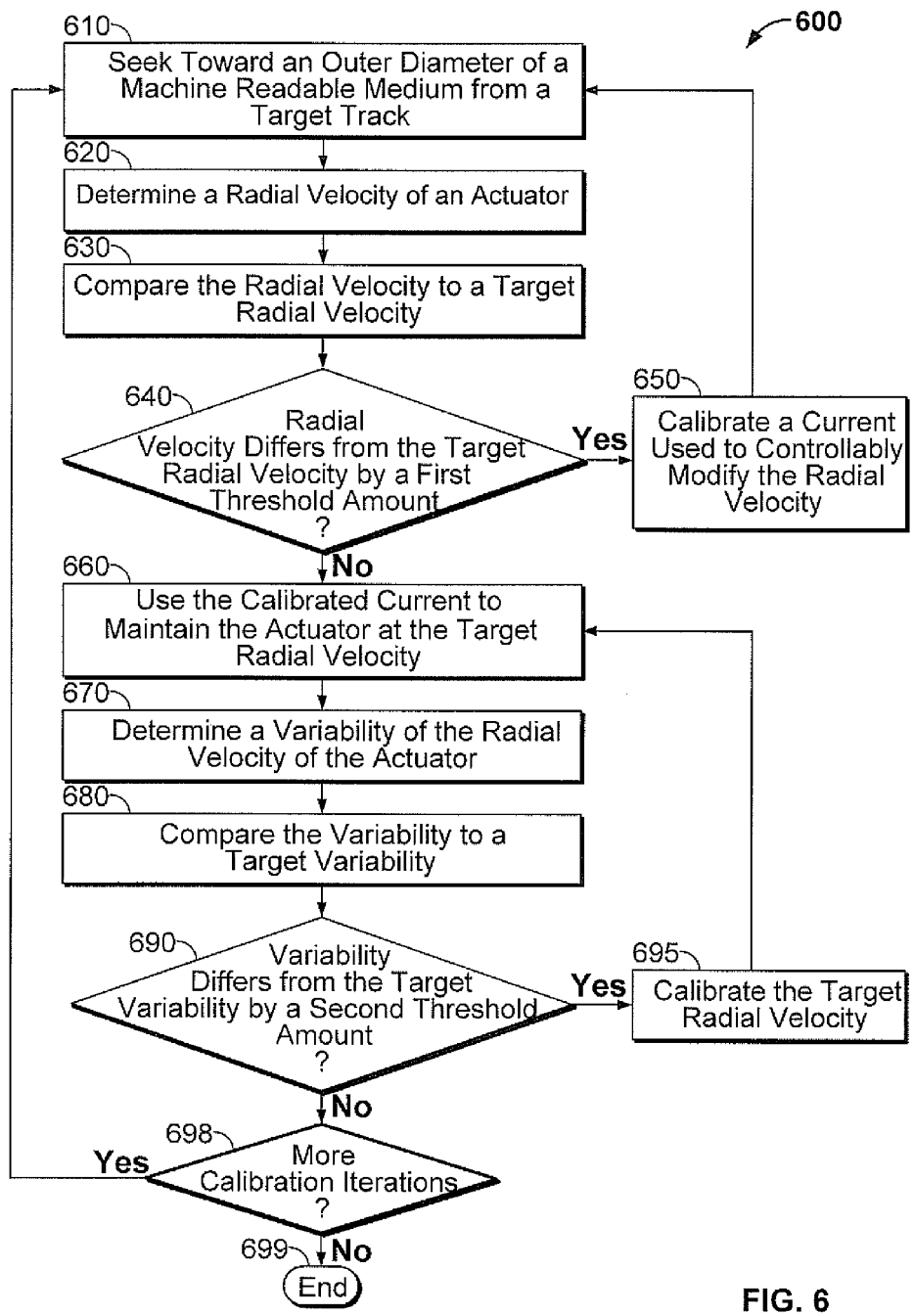
FIG. 6 is an example process for calibrating a voice coil motor.

FIG. 6 is an example process 600 for calibrating a voice coil motor. The process 600 can be directed toward calibrating a current applied to the VCM. The process 600 includes seeking 610 toward an outer diameter of a machine readable medium from a target servo track to a blank portion of the machine readable medium. For example, the control module 510 can direct a servo controller to control the movement of a head arm so that an associated head seeks toward an outer diameter of a machine readable medium from a target servo track to a blank portion of the machine readable medium. By seeking from a target servo track, the head can be maintained over existing servo tracks in the servo band while the VCM is accelerated to a constant target velocity. For example, the VCM can reach the constant target velocity at a predetermined track, preferably near the blank portion of the machine readable medium. Furthermore, by seeking toward the outer diameter of the machine readable medium, the head arm can move in a manner to simulate the movement of the head when spirals are written.

A radial velocity of an actuator can be determined 620 after accelerating the actuator to a target radial velocity. For example, a read head can read positioning and timing information (e.g., track numbers) from the servo tracks in the servo band on the machine readable medium. The control module 510 can store the timing information in the memory 540, and the comparison module 520 can determine the radial velocity from the timing information. In some implementations, the radial velocity can be an average of a plurality of radial velocity measurements from a plurality of samples (e.g., samples of less than 100 micro-seconds). In some implementations, the radial velocity of the actuator can be determined from the timing information by the control module 510 or the calibration module 530. The radial velocity can be stored in the memory 540. The radial velocity is compared 630 to a target radial velocity. For example, the comparison module 520 can compare the radial velocity to a target radial velocity. The target radial velocity can be a predetermined value that is stored in the memory 540.

A current used to controllably modify the radial velocity of the actuator is calibrated 650, if the radial velocity differs from the target radial velocity by a first threshold amount ("Yes" branch of step 640). For example, the calibration module 530 can calibrate the current (e.g., decrease, increase) if the average radial velocity of the actuator is greater than, or less than, the target radial velocity by the first threshold amount. The first threshold amount can be, for example, a predetermined value stored in the memory 540. The calibration module 530 can calibrate the current profile that is stored in the memory 540. The control module 510 can use the current profile to calibrate the current (e.g., increase or decrease the current during portion 475). After the current is calibrated, the process can return to step 610.

If the average radial velocity of the actuator does not differ from the target radial velocity by the first threshold amount ("No" branch of step 640), the calibrated current can be used 660 to maintain the actuator at the target radial velocity. For example, the control module 510 can direct a servo controller to move a head arm so that an associated head seeks toward an outer diameter of a machine readable medium from a target servo track at the target radial velocity.

The variability of the radial velocity of the actuator can be determined 670. For example, the control module 510 can determine the variability of the radial velocity of the actuator. The variability of the radial velocity can be stored in the memory 540. The variability can be compared 680 to a target variability (e.g., an acceptable standard deviation of the velocity). For example, the comparison module 520 can compare the variability to a target variability. The target variability can be a predetermined value stored in the memory 540. The target radial velocity can be calibrated 695, if the variability differs from the target variability by a second threshold amount ("Yes" branch of step 690). The second threshold amount can be, for example, a predetermined value stored in the memory 540. The calibration module 530 can calibrate the target radial velocity. The calibrated target radial velocity can be stored in the memory 540. If the variability does not differ from the target variability by a second threshold amount ("No" branch of step 690), then, optionally, more calibration iterations can be performed.

In some implementations, one or more iterations of the one or more steps of the process 600 can be performed to calibrate the current. For example, if more iterations are to be performed ("Yes" branch of step 698), the process can return to step 610. If no more iterations are to be performed ("No" branch of step 698), the process can end 699. After the current is calibrated, the current can be used to maintain the actuator at a constant, radial velocity for use in writing spirals. The spirals can be used to write servo tracks.

Figure 7:
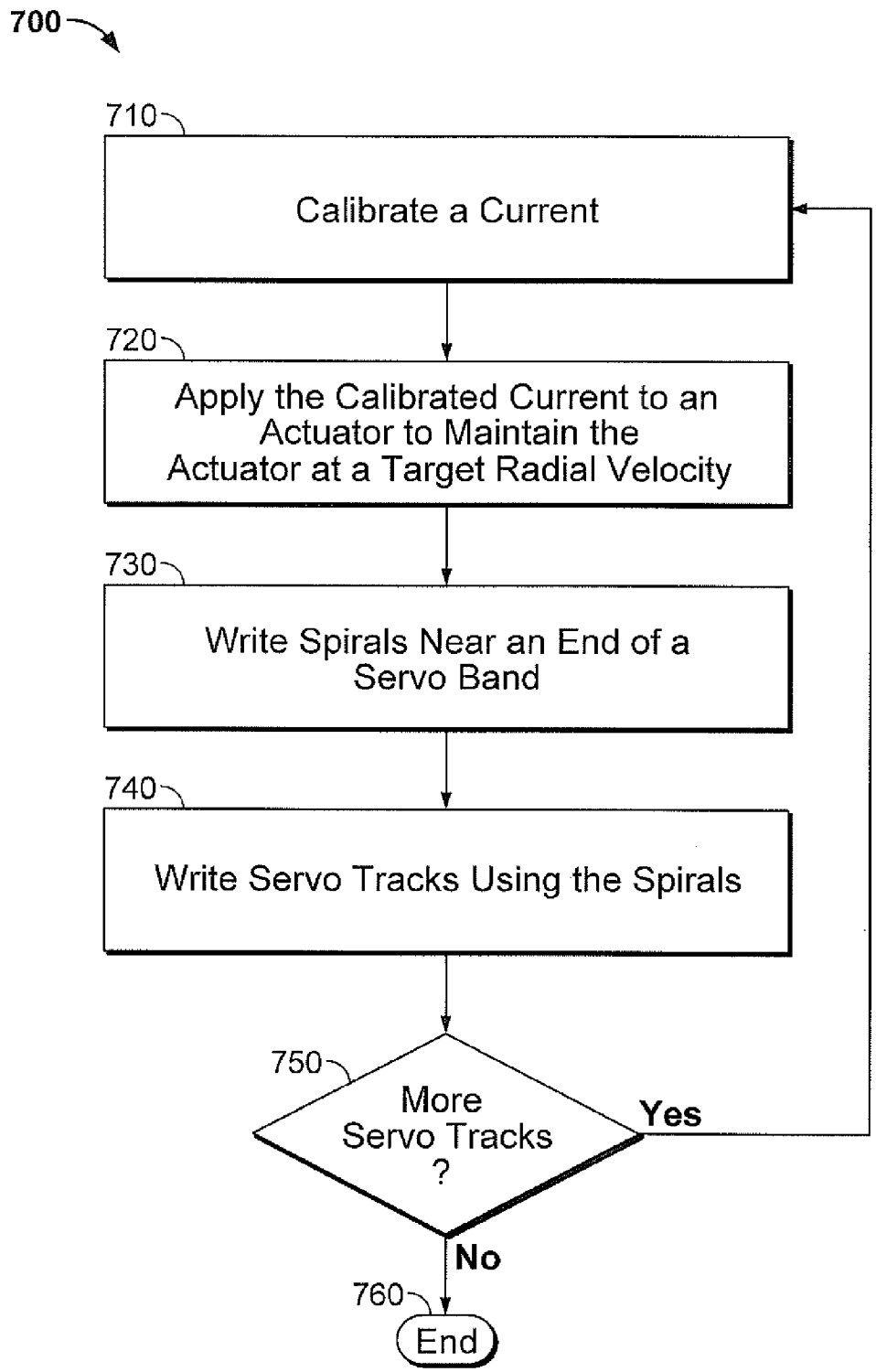
FIG. 7 is an example process for writing servo tracks.

FIG. 7 is an example process 700 for writing servo tracks. A current is calibrated 710. For example, the current can be calibrated according to process 600. The calibrated current is applied 720 to an actuator to maintain the actuator at a target radial velocity (e.g., at a target radius on a blank portion of a machine readable medium). Spirals are written 730 near an end of a servo band. For example, a write gate can be activated, and the spirals 210 can be written near the end of the first set of servo tracks 110. The location where the write gate is activated can be referred to as a target radius. Servo tracks are written 740 using the spirals. For example, the servo tracks 220 can be written using the spirals 210. In some implementations, a small overlap (e.g., a set of ten servo tracks) can overlap with the spirals, so that control of the heads, for example, can be switched from the servo tracks to the spirals. If more servo tracks are to be written ("Yes" branch of step 750), then the process returns to step 710. If no more servo tracks are to be written ("No" branch of step 750), then the process ends 760.

Figure 8B:
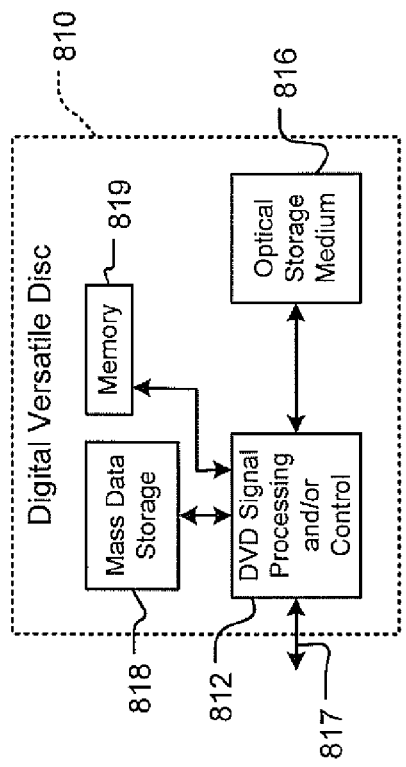
FIGS. 8A-8G show various example implementations of the described systems and techniques.
Figure 8A:
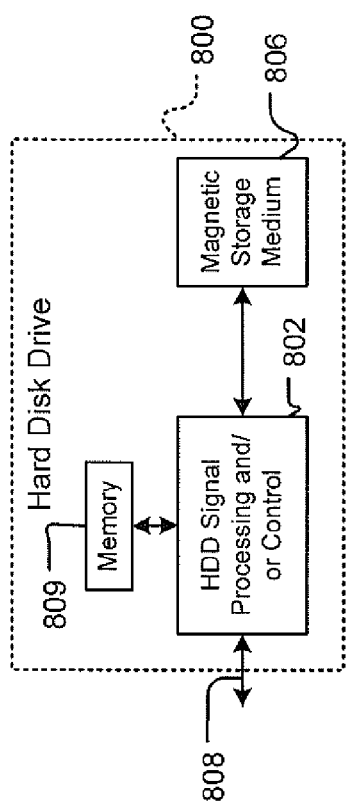

FIGS. 8A-8G show various example implementations of the described systems and techniques. Referring now to FIG. 8A, the described systems and techniques can be implemented in a hard disk drive (HDD) 800. The described systems and techniques may be implemented in either or both signal processing and/or control circuits, which are generally identified in FIG. 8A at 802. In some implementations, the signal processing and/or control circuit 802 and/or other circuits (not shown) in the HDD 800 may process data, perform coding and/or encryption, perform calculations, and/or format data that is output to and/or received from a magnetic storage medium 806.

The HDD 800 may communicate with a host device (not shown) such as a computer, mobile computing devices such as personal digital assistants, cellular phones, media or MP3 players and the like, and/or other devices via one or more wired or wireless communication links 808. The HDD 800 may be connected to memory 809 such as random access memory (RAM), low latency nonvolatile memory such as flash memory, read only memory (ROM) and/or other suitable electronic data storage.

Referring now to FIG. 8B, the described systems and techniques can be implemented in a digital versatile disc (DVD) drive 810. The described systems and techniques may be implemented in either or both signal processing and/or control circuits, which are generally identified in FIG. 8B at 812, and/or mass data storage of the DVD drive 810. The signal processing and/or control circuit 812 and/or other circuits (not shown) in the DVD drive 810 may process data, perform coding and/or encryption, perform calculations, and/or format data that is read from and/or data written to an optical storage medium 816. In some implementations, the signal processing and/or control circuit 812 and/or other circuits (not shown) in the DVD drive 810 can also perform other functions such as encoding and/or decoding and/or any other signal processing functions associated with a DVD drive.

The DVD drive 810 may communicate with an output device (not shown) such as a computer, television or other device via one or more wired or wireless communication links 817. The DVD drive 810 may communicate with mass data storage 818 that stores data in a nonvolatile manner. The mass data storage 818 may include a hard disk drive (HDD). The HDD may have the configuration shown in FIG. 8A. The HDD may be a mini HDD that includes one or more platters having a diameter that is smaller than approximately 1.8". The DVD drive 810 may be connected to memory 819 such as RAM, ROM, low latency nonvolatile memory such as flash memory and/or other suitable electronic data storage.

Figure 8D:
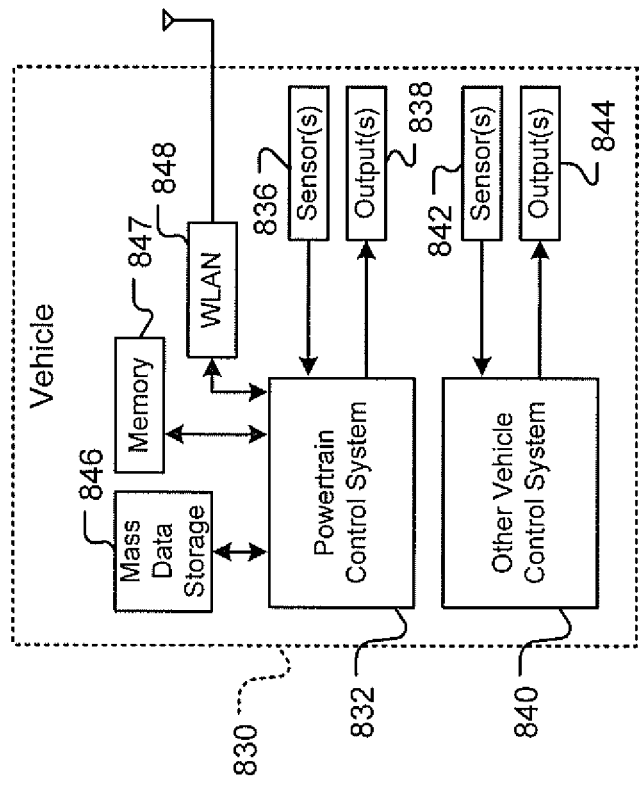
Figure 8C:
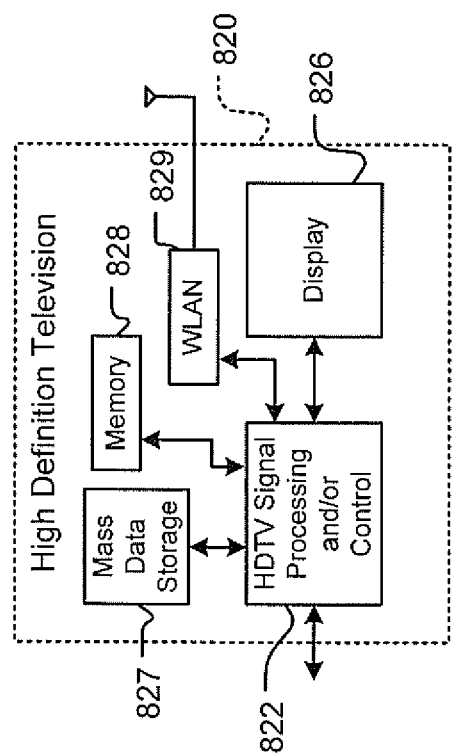

Referring now to FIG. 8C, the described systems and techniques can be implemented in a high definition television (HDTV) 820. The described systems and techniques may be implemented in either or both signal processing and/or control circuits, which are generally identified in FIG. 8C at 822, a WLAN interface and/or mass data storage of the HDTV 820. The HDTV 820 receives HDTV input signals in either a wired or wireless format and generates HDTV output signals for a display 826. In some implementations, signal processing circuit and/or control circuit 822 and/or other circuits (not shown) of the HDTV 820 may process data, perform coding and/or encryption, perform calculations, format data and/or perform any other type of HDTV processing that may be required.

The HDTV 820 may communicate with mass data storage 827 that stores data in a nonvolatile manner such as optical and/or magnetic storage devices. At least one HDD may have the configuration shown in FIG. 8A and/or at least one DVD drive may have the configuration shown in FIG. 8B. The HDD may be a mini HDD that includes one or more platters having a diameter that is smaller than approximately 1.8". The HDTV 820 may be connected to memory 828 such as RAM, ROM, low latency nonvolatile memory such as flash memory and/or other suitable electronic data storage. The HDTV 820 also may support connections with a WLAN via a WLAN interface 829.

Referring now to FIG. 8D, the described systems and techniques may be implemented in a control system of a vehicle 830, a WLAN interface and/or mass data storage of the vehicle control system. In some implementations, the described systems and techniques may be implemented in a powertrain control system 832 that receives inputs from one or more sensors 836 such as temperature sensors, pressure sensors, rotational sensors, airflow sensors and/or any other suitable sensors and/or that generates one or more output control signals such as engine operating parameters, transmission operating parameters, braking parameters, and/or other control signals to one or more output devices 838.

The described systems and techniques may also be implemented in other control systems 840 of the vehicle 830. The control system 840 may likewise receive signals from input sensors 842 and/or output control signals to one or more output devices 844. In some implementations, the control system 840 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 832 may communicate with mass data storage 846 that stores data in a nonvolatile manner. The mass data storage 846 may include optical and/or magnetic storage devices for example hard disk drives and/or DVD drives. At least one HDD may have the configuration shown in FIG. 8A and/or at least one DVD drive may have the configuration shown in FIG. 8B. The HDD may be a mini HDD that includes one or more platters having a diameter that is smaller than approximately 1.8". The powertrain control system 832 may be connected to memory 847 such as RAM, ROM, low latency nonvolatile memory such as flash memory and/or other suitable electronic data storage. The powertrain control system 832 also may support connections with a WLAN via a WLAN interface 848. The control system 840 may also include mass data storage, memory and/or a WLAN interface (all not shown).

Figure 8E:
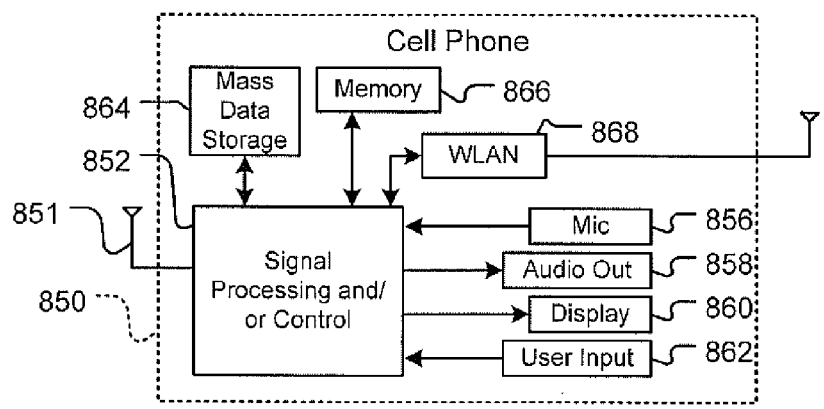

Referring now to FIG. 8E, the described systems and techniques can be implemented in a cellular phone 850 that may include a cellular antenna 851. The described systems and techniques may be implemented in either or both signal processing and/or control circuits, which are generally identified in FIG. 8E at 852, a WLAN interface and/or mass data storage of the cellular phone 850. In some implementations, the cellular phone 850 includes a microphone 856, an audio output 858 such as a speaker and/or audio output jack, a display 860 and/or an input device 862 such as a keypad, pointing device, voice actuation and/or other input device. The signal processing and/or control circuits 852 and/or other circuits (not shown) in the cellular phone 850 may process data, perform coding and/or encryption, perform calculations, format data and/or perform other cellular phone functions.

The cellular phone 850 may communicate with mass data storage 864 that stores data in a nonvolatile manner such as optical and/or magnetic storage devices for example hard disk drives and/or DVD drives. At least one HDD may have the configuration shown in FIG. 8A and/or at least one DVD drive may have the configuration shown in FIG. 8B. The HDD may be a mini HDD that includes one or more platters having a diameter that is smaller than approximately 1.8". The cellular phone 850 may be connected to memory 866 such as RAM, ROM, low latency nonvolatile memory such as flash memory and/or other suitable electronic data storage. The cellular phone 850 also may support connections with a WLAN via a WLAN interface 868.

Figure 8F:
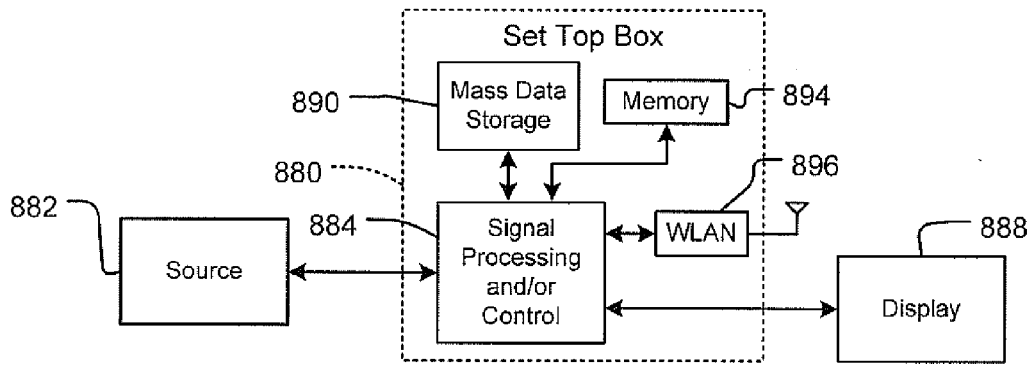

Referring now to FIG. 8F, the described systems and techniques can be implemented in a set top box 880. The described systems and techniques may be implemented in either or both signal processing and/or control circuits, which are generally identified in FIG. 8F at 884, a WLAN interface and/or mass data storage of the set top box 880. The set top box 880 receives signals from a source 882 such as a broadband source and outputs standard and/or high definition audio/video signals suitable for a display 888 such as a television and/or monitor and/or other video and/or audio output devices. The signal processing and/or control circuits 884 and/or other circuits (not shown) of the set top box 880 may process data, perform coding and/or encryption, perform calculations, format data and/or perform any other set top box function.

The set top box 880 may communicate with mass data storage 890 that stores data in a nonvolatile manner. The mass data storage 890 may include optical and/or magnetic storage devices for example hard disk drives and/or DVD drives. At least one HDD may have the configuration shown in FIG. 8A and/or at least one DVD drive may have the configuration shown in FIG. 8B. The HDD may be a mini HDD that includes one or more platters having a diameter that is smaller than approximately 1.8". The set top box 880 may be connected to memory 894 such as RAM, ROM, low latency nonvolatile memory such as flash memory and/or other suitable electronic data storage. The set top box 880 also may support connections with a WLAN via a WLAN interface 896.

Figure 8G:
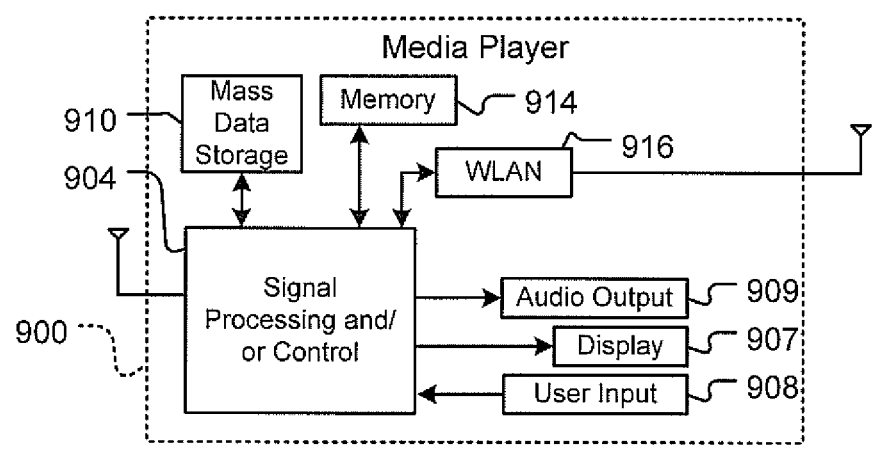

Referring now to FIG. 8G, the described systems and techniques can be implemented in a media player 900. The described systems and techniques may be implemented in either or both signal processing and/or control circuits, which are generally identified in FIG. 8G at 904, a WLAN interface and/or mass data storage of the media player 900. In some implementations, the media player 900 includes a display 907 and/or a user input 908 such as a keypad, touchpad and the like. In some implementations, the media player 900 may employ a graphical user interface (GUI) that typically employs menus, drop down menus, icons and/or a point-and-click interface via the display 907 and/or user input 908. The media player 900 further includes an audio output 909 such as a speaker and/or audio output jack. The signal processing and/or control circuits 904 and/or other circuits (not shown) of the media player 900 may process data, perform coding and/or encryption, perform calculations, format data and/or perform any other media player function.

The media player 900 may communicate with mass data storage 910 that stores data such as compressed audio and/or video content in a nonvolatile manner. In some implementations, the compressed audio files include files that are compliant with MP3 (Moving Picture experts group audio layer 3) format or other suitable compressed audio and/or video formats. The mass data storage may include optical and/or magnetic storage devices for example hard disk drives and/or DVD drives. At least one HDD may have the configuration shown in FIG. 8A and/or at least one DVD drive may have the configuration shown in FIG. 8B. The HDD may be a mini HDD that includes one or more platters having a diameter that is smaller than approximately 1.8". The media player 900 may be connected to memory 914 such as RAM, ROM, low latency nonvolatile memory such as flash memory and/or other suitable electronic data storage. The media player 900 also may support connections with a WLAN via a WLAN interface 916. Still other implementations in addition to those described above are contemplated.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. An apparatus comprising:
   a controller comprising processing circuitry, the controller comprising:
   a control module configured to cause an actuator to seek toward an outer diameter of a machine readable medium from a servo track, which is in a previously written servo band, to a blank portion of the machine readable medium, and determine a radial velocity of the actuator, within the servo band, after accelerating the actuator to a target radial velocity;
   a comparison module configured to compare the radial velocity to the target radial velocity; and
   a calibration module configured to calibrate a current used to modify the radial velocity of the actuator if the radial velocity is different from the target radial velocity.

2. The apparatus of claim 1 wherein the calibration module is configured to calibrate the current if the radial velocity is different from the target radial velocity by a predetermined value.

3. The apparatus of claim 1 wherein the calibration module is configured to calibrate the current to maintain the actuator at a constant radial velocity.

4. The apparatus of claim 1 further comprising:
   a head connected with the actuator;
   wherein the control module is configured to cause the head to write one or more spirals near an end of the servo band and to write one or more servo tracks using the one or more spirals.

5. The apparatus of claim 1 wherein the calibration module is configured to calibrate the target radial velocity in response to variations in the radial velocity.

6. A method comprising:
   seeking toward an outer diameter of a machine readable medium from a servo track, which is in a previously written servo band, to a blank portion of the machine readable medium;
   determining a radial velocity of an actuator, within the servo band, after accelerating the actuator to a target radial velocity;
   comparing the radial velocity to the target radial velocity; and
   calibrating a current used to modify the radial velocity of the actuator if the radial velocity is different from the target radial velocity;
   wherein the determining, the comparing, and the calibrating are performed by a controller comprising processing circuitry.

7. The method of claim 6 wherein calibrating the current comprises calibrating the current if the radial velocity is different from the target radial velocity by a predetermined value.

8. The method of claim 6 wherein calibrating the current comprises causing the current to maintain the actuator at a constant radial velocity.

9. The method of claim 6 further comprising calibrating the target radial velocity in response to variations in the radial velocity.

10. The method of claim 6 further comprising:
    writing one or more spirals near an end of the servo band; and
    writing one or more servo tracks using the one or more spirals.

11. A method comprising:
    seeking, by an actuator, toward an outer diameter of a machine readable medium from a first servo band to a blank portion of the machine readable medium;

calibrating a current based on one or more of position and timing information derived from the first servo band;

writing one or more servo tracks to the blank portion of the machine readable medium as a second servo band by:
maintaining the actuator at a target radial velocity based on the calibrated current;
writing one or more spirals near an end of the first servo band; and
writing the one or more servo tracks as the second servo band using the one or more spirals.

12. The method of claim 11 further comprising:
calibrating the target radial velocity in response to variations in a radial velocity of the actuator.

13. A system comprising:
an actuator;
a control module configured to cause the actuator to seek toward an outer diameter of a machine readable medium from a servo track, which is in a previously written servo band, to a blank portion of the machine readable medium, and determine a radial velocity of the actuator, within the servo band, after accelerating the actuator to a target radial velocity;
a comparison module configured to compare the radial velocity to the target radial velocity; and
a calibration module configured to calibrate a current used to modify the radial velocity of the actuator if the radial velocity is different from the target radial velocity.

14. The system of claim 13 wherein the calibration module is configured to calibrate the current if the radial velocity is different from the target radial velocity radial velocity by a predetermined value.

15. The system of claim 13 wherein the calibration module is configured to calibrate the current to maintain the actuator at a constant radial velocity.

16. The system of claim 13 further comprising:
a head connected with the actuator;
wherein the control module is configured to write one or more spirals near an end of the servo band and to write one or more servo tracks using the one or more spirals.

17. An apparatus comprising:
a servo controller configured cause an actuator to seek toward an outer diameter of a machine readable medium from a target servo track to a blank portion of the machine readable medium; and
processing circuitry configured to:
maintain a slope value of a curve representing a location of the actuator with respect to the blank portion of the machine readable medium to match a predetermined constant slope value; and
cause the actuator to write spirals on the blank portion of the machine readable medium at the predetermined constant slope value.

18. The apparatus of claim 17 wherein the processing circuitry is configured to calibrate a current for controlling the actuator, the current having predetermined values corresponding to respective portions of the curve.

19. The apparatus of claim 17 wherein the processing circuitry is configured to reduce variation in placement of the spirals by causing the actuator to write the spirals in accordance with the predetermined constant slope value.

20. The apparatus of claim 17 wherein the processing circuitry is configured to:
cause the actuator to write the spirals near an end of a servo band; and
cause the actuator to write one or more servo tracks using the spirals.

* * * * *